Patented Aug. 9, 1949

2,478,169

UNITED STATES PATENT OFFICE 2,478,169

METHOD OF MAKING AND BOTTLING CARBONATED BEVERAGES

John L. Kellogg, Chicago, Ill.

No Drawing. Application August 2, 1946, Serial No. 687,969

3 Claims. (Cl. 99—79)

This invention relates to an improved method of making and bottling a carbonated beverage.

A principal object of the invention is to provide an improved method for producing and bottling a carbonated beverage containing flavoring substances which normally foam very readily when mixed with carbonated liquid, but which, according to my improved method, may be mixed in an open container for immediate serving or bottled without excessive foaming.

A further and more specific object of the invention is to provide an improved method whereby a carbonated coffee beverage composed of a mixture of coffee flavored syrup and carbonated water may be mixed together without excessive foaming and without the use of foam inhibiting chemicals.

When a syrup, composed of a concentrated coffee extract and dextrose, maltose or other sugar is mixed with carbonated water, a profused foaming is produced in the mixture. Such foaming makes it impractical to mix and dispense the beverage in a cup or other drinking vessel for immediate consumption. The excessive foaming is not only wasteful of materials but also interferes with the bottling of the beverage. The foaming may be inhibited by the use of various chemicals, but the use of foam-inhibiting chemicals, even though they may not be harmful for human consumption, are very undesirable. They tend to combine with the ingredients in such manner as to materially alter and detract from the delicate taste and aroma of the coffee flavor.

I have found that a carbonated coffee beverage can be produced without objectionable foaming by lowering the temperature of the coffee flavored syrup or the temperature of the carbonated water, or both, to near or below the freezing point. The low temperature of the substances in the mixture tends to arrest their foam producing properties to such extent that they may be mixed without profused foaming. In some instances, for example when mixing the beverage in an open drinking vessel for immediate consumption, I preferably chill both the coffee flavored syrup and the carbonated water to approximately 38° Fahrenheit. The carbonated beverage produced in such case will remain mildly effervescent for a moderate period of time as it absorbs the warmth of the surrounding atmosphere, but it will not produce excessive foam. In other instances, for example when bottling the beverage, I preferably introduce a suitable quantity of the coffee syrup into a bottle and freeze it to form a solid mass. I then introduce the desired amount of carbonated water into the bottle and securely seal the bottle. Preferably, the carbonated water is previously chilled before it is introduced into the bottle so as to avoid much melting of the frozen syrup. After the bottle is securely sealed, the frozen syrup dissolves gradually and mixes with the carbonated water. The carbonic gas which may be liberated from the liquid during the mixing function will collect in the neck of the bottle above the liquid therein. Inasmuch as the liberation of gas is relatively slow, there will be no appreciable foaming.

The coffee flavored syrup may be made in any suitable manner. However, in order to provide an improved flavor and aroma, the freshly ground and roasted coffee is soaked in a thin hot solution of water and a sugar. The thin, sweetened liquid serves to retain a larger amount of the flavor and aroma principles of the coffee than when unsweetened water is used. After the coffee extract, by repeated soaking and percolations has acquired the desired strength, it is mixed with sugar solutions some of which includes caramelized sugar dissolved in coffee extract. The strength of the coffee extract and the amount contained in the syrup is preferably such that one ounce of the syrup when mixed with five ounces of carbonated water in the manner above described will make a highly palatable and refreshing beverage.

As an alternative for the bottling method hereinabove described, the carbonated water may be frozen or chilled to a low temperature and the coffee flavored syrup then introduced into the bottle.

If a sour flavored beverage is desired, 20 to 30 grams of phosphoric acid may be added to each gallon of the coffee sugar syrup.

I claim:

1. The method of inhibiting excessive foaming during the bottling of a beverage composed of carbonated water and a flavoring syrup, which method includes the steps of introducing a predetermined amount of the flavoring syrup into a bottle, subjecting the bottle and the syrup therein to freezing temperatures until the syrup is frozen solid, introducing into the bottle at substantially atmospheric pressure a predetermined amount of carbonated water, and thereafter securely sealing the bottle from the atmosphere before the frozen syrup is melted, whereby the syrup and water are mixed together slowly as the syrup melts.

2. The method of inhibiting excessive foaming during the bottling of a beverage composed of carbonated water and a flavoring syrup, which method includes the steps of introducing a predetermined amount of the flavoring syrup into a bottle, subjecting the bottle and the syrup therein to freezing temperatures until the syrup is frozen solid, introducing into the bottle at substantially atmospheric pressure a predetermined amount of carbonated water chilled to a temperature slightly above freezing, and thereafter securely sealing the bottle from the atmosphere before the frozen syrup is melted, whereby the syrup and water are mixed together slowly as the syrup melts.

3. The method of inhibiting excessive foaming during the bottling of a beverage composed of carbonated water and a coffee flavored syrup which method includes the steps of introducing a predetermined amount of carbonated water into a bottle and freezing it therein and thereafter introducing at substantially atmospheric pressure a predetermined amount of said syrup into the bottle and applying a closure cap thereto before substantial mixing of the water and syrup is effected, whereby a slow mixing of the water and syrup is effected upon the melting of the frozen water.

JOHN L. KELLOGG.

REFERENCES CITED

The following references are of record in the file of this patent:

UNITED STATES PATENTS

| Number | Name | Date |
|---|---|---|
| 850,607 | Schroder | Apr. 16, 1907 |
| 1,243,068 | Humphrey | Oct. 16, 1917 |
| 1,373,817 | Humphrey | Apr. 5, 1921 |
| 2,227,101 | Meyer | Dec. 31, 1940 |
| 2,394,303 | Griesbeck | Feb. 5, 1946 |

OTHER REFERENCES

"Food Industries," July 1940, Carbonated Beverages.